(12) United States Patent
Torii et al.

(10) Patent No.: US 6,789,526 B2
(45) Date of Patent: Sep. 14, 2004

(54) APPARATUS FOR CONTROLLING THROTTLE VALVE AND MANUFACTURING METHOD FOR THE SAME AND MOTOR

(75) Inventors: Katsuya Torii, Anjo (JP); Yutaka Kawai, Hekinan (JP); Yuichiro Miura, Anjo (JP)

(73) Assignee: Denso Corporation (JP)

( * ) Notice: Subject to any disclaimer, the term of this patent is extended or adjusted under 35 U.S.C. 154(b) by 124 days.

(21) Appl. No.: 10/062,519

(22) Filed: Feb. 5, 2002

(65) Prior Publication Data
US 2002/0104511 A1 Aug. 8, 2002

(30) Foreign Application Priority Data

| Feb. 8, 2001 | (JP) | 2001-032911 |
| Feb. 9, 2001 | (JP) | 2001-034481 |
| Mar. 27, 2001 | (JP) | 2001-091002 |
| Dec. 20, 2001 | (JP) | 2001-388056 |
| Dec. 20, 2001 | (JP) | 2001-388220 |

(51) Int. Cl.$^7$ ............... F02D 9/10; F02D 9/02; F02D 11/10
(52) U.S. Cl. .................................. 123/399
(58) Field of Search ......................... 123/399

(56) References Cited

U.S. PATENT DOCUMENTS

| 4,909,212 A | * | 3/1990 | Minowa et al. ............. 123/337 |
| 5,664,542 A | * | 9/1997 | Kanazawa et al. .......... 123/399 |
| 6,067,958 A | * | 5/2000 | Kamimura et al. ......... 123/399 |

FOREIGN PATENT DOCUMENTS

| JP | 7-49780 | 5/1995 |
| JP | 7-166897 | 6/1995 |
| JP | 10-317998 | 12/1998 |

* cited by examiner

Primary Examiner—Mahmoud Gimie
Assistant Examiner—Arnold Castro
(74) Attorney, Agent, or Firm—Nixon & Vanderhye PC

(57) ABSTRACT

An apparatus for controlling a throttle valve has a body member made of resin. The body member contains a motor for controlling a throttle valve. The motor has a yoke as a one of components thereof. The yoke is exposed to an intake passage at a slightly upstream side of the throttle valve. According to the arrangement, heat radiation from the motor is improved by intake airflow, and the throttle valve can be prevented from an icing malfunction.

10 Claims, 14 Drawing Sheets

APPARATUS FOR CONTROLLING THROTTLE VALVE AND MANUFACTURING METHOD FOR THE SAME AND MOTOR

CROSS REFERENCE TO RELATED APPLICATION

This application is based on Japanese Patent Applications No. 2001-32911 filed on Feb. 8, 2001, No. 2001-34481 filed on Feb. 9, 2001, No. 2001-91002 filed on Mar. 27, 2001, No. 2001-388220 filed on Dec. 20, 2001, and No. 2001-388056 filed on Dec. 20, 2001, the contents of which are incorporated herein by reference.

BACKGROUND OF THE INVENTION

1. Field of the Invention

The present invention relates to an apparatus for controlling a throttle valve, a method for manufacturing an apparatus for controlling a throttle valve and a motor apparatus.

2. Description of Related Art

If the temperature is cold, the valve of the throttle valve may get a malfunction by an icing. The icing is caused by moisture in the air condensed within the intake pipe and froze on a contact portion among a valve of the throttle valve and an inner wall of the intake pipe.

JP-B-H07-49780 discloses an apparatus for controlling a throttle valve for heating a vicinity of the valve by flowing an engine coolant through a part of a throttle valve housing for preventing it from getting cold. However, according to the arrangement disclosed in the publication, a construction is complex and also the cost may be expansive. Moreover, since the passage of the engine coolant is only arranged on a very little part of a portion of the throttle valve housing that is vicinity of the valve, if the throttle valve housing is made of a low heat conductive resin or the like, it may be difficult to prevent the valve from the icing malfunction.

JP-A-H07-166897 discloses an apparatus for controlling a throttle valve with a motor. The motor is directly provided in a body member for the purpose of improving heat radiation and a vibration resistance. A body member is formed of aluminum and the like in order to reduce its weight and improve its heat radiation, and a bearing holder member is attached to the body member by means of such as screws or machine screws.

However, the above-described attachment of the motor housing and the bearing holder member to the body member by means of the screws or the machine screws undesirably causes the number of parts and the number of assembly processes to be increased, which results in a serious difficulty to decrease the manufacture cost of the entire body of a throttle valve with a motor.

JP-A-H10-317998 discloses an apparatus for controlling a throttle valve. The apparatus has a throttle body having a water passage through which an engine coolant flows. However, the water passage is only contact with a part of a circumference of an intake air passage. Therefore it is difficult to heat the throttle valve body sufficiently. Further, in case of the water passage being formed in the throttle body, it is important to seal water in the passage.

SUMMARY OF THE INVENTION

Therefore it is an object of the present invention to provide an apparatus for controlling a throttle valve which is capable of preventing the icing malfunction effectively.

It is another object of the present invention to provide a motor apparatus which is capable of reducing number of parts and manufacturing cost.

It is a further object of the present invention to improve reliability of an apparatus for controlling a throttle valve made of resin.

According to an aspect of the present invention, a yoke of a motor for controlling a throttle valve is exposed to an intake air. Therefore the motor is cooled and a valve is prevented from the icing malfunction.

According to the other aspect of the present invention, a passage through which a heat conductive medium flows is arranged to pass through a vicinity of the motor. Therefore, the heat conductive medium is heated by the motor and the valve is prevented from the icing malfunction.

According to the other aspect of the present invention, a bearing holder member and a body member are made of the same resin and are welded. This arrangement makes it easy to manufacture and reduces number of parts.

According to the other aspect of the present invention, the body member is made of resin and has a passage in which a heat conductive medium flows. In case of the above arrangement, bridge portions are arranged in the passage to strengthen the body member. In case of another arrangement, the body member is formed as a seamless body to provide a reliable seal on the passage. In case of still another arrangement, the body member provides pipes for an intake and an outlet of the passages, which are formed by joining separate parts. This arrangement provides reliable seal on the passage.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
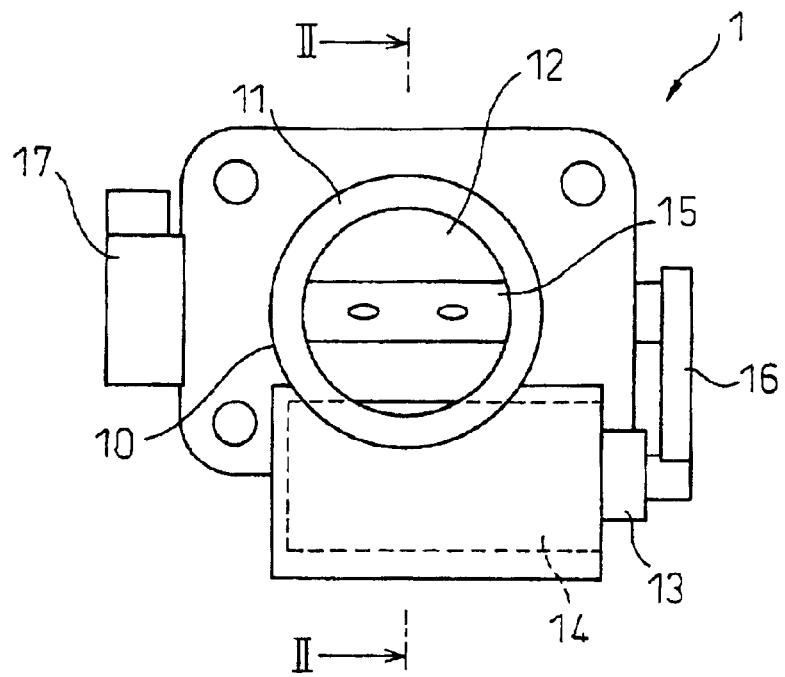
FIG. 1 is a front view schematically showing an apparatus for controlling a throttle valve with a motor according to a first embodiment of the present invention.

Herein after preferred embodiments of the present invention will be described with reference to the drawings. In this invention, an apparatus for controlling a throttle valve has a motor for electrically control an opening degree of the throttle valve or a mechanical link for manually control the opening degree of the throttle valve.

In the drawings, the same or similar components are designated by the same reference numerals, and the explanation will not be repeated.

Figure 2:
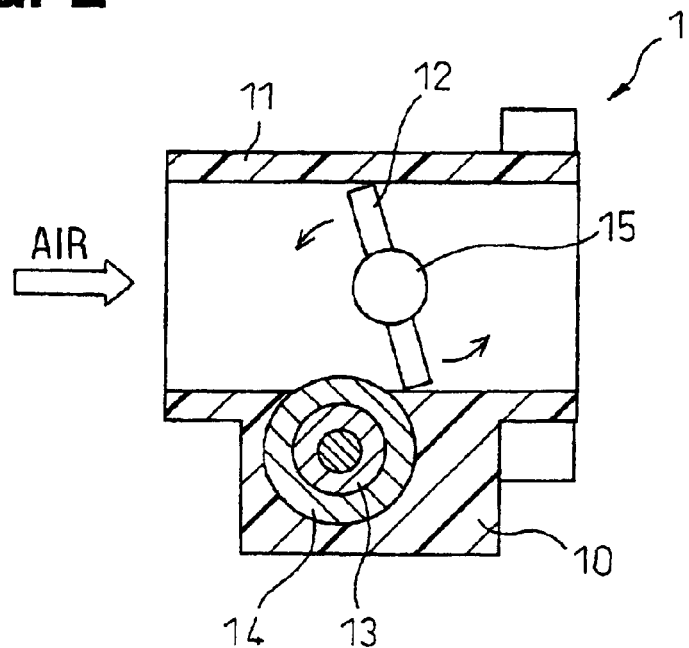
FIG. 2 is a sectional view schematically showing the apparatus taken along a section line II—II in FIG. 1.

Referring to FIGS. 1 and 2, an apparatus for controlling a throttle valve 1 has a throttle valve housing (body member) 10. The throttle valve housing 10 has a part for forming a substantially cylindrical intake pipe 11 in which a valve 12 of a throttle valve is disposed, and a part for holding motor components such as a substantially cylindrical yoke 14. The motor components supported on the throttle valve housing 10 provide a motor 13. In this embodiment, the throttle valve housing 10 has the above-described two parts formed integrally and made of resin. In the intake pipe 11, a throttle valve shaft 15 for the valve 12 is provided to be capable of rotating. The valve 12 opens and closes a passage in the intake pipe 11 by its rotating movement. The motor 13 is disposed in the throttle valve housing 10 with its rotation shaft parallel to the throttle valve shaft 15. The output end of the motor 13 is connected to power transmitting means 16 connected to the throttle valve shaft 15. The output of the motor is transmitted to the valve 12 through the power transmitting means 16 to control the opening degree. The opening degree of the throttle valve (opening degree of the valve) is detected by a throttle position sensor 17 and used for controlling the throttle valve.

In this embodiment, the motor 13 is arranged so that a part of its yoke 14 is exposed to the intake pipe 11 in a slightly upstream side of the valve 12 and the yoke 14 directly comes into contact with a flow of air flowing in the intake pipe 11. The exposed part is designed not to interfere with the rotating operation of the valve 12 as shown by arrow marks in FIG. 2.

According to the above-described constitution, since the flow of air in the intake pipe 11 directly comes into contact with the yoke 14, the heat radiation of the motor 13 is accelerated and the heat radiation of the motor is further improved without requiring any additional member. Thus, the deterioration of the torque of the motor due to the superheat of the motor is prevented. Therefore, a compact motor whose torque is the smaller for a conventionally expected deterioration of torque can be set and the entire body of the apparatus is made compact.

Figure 3:
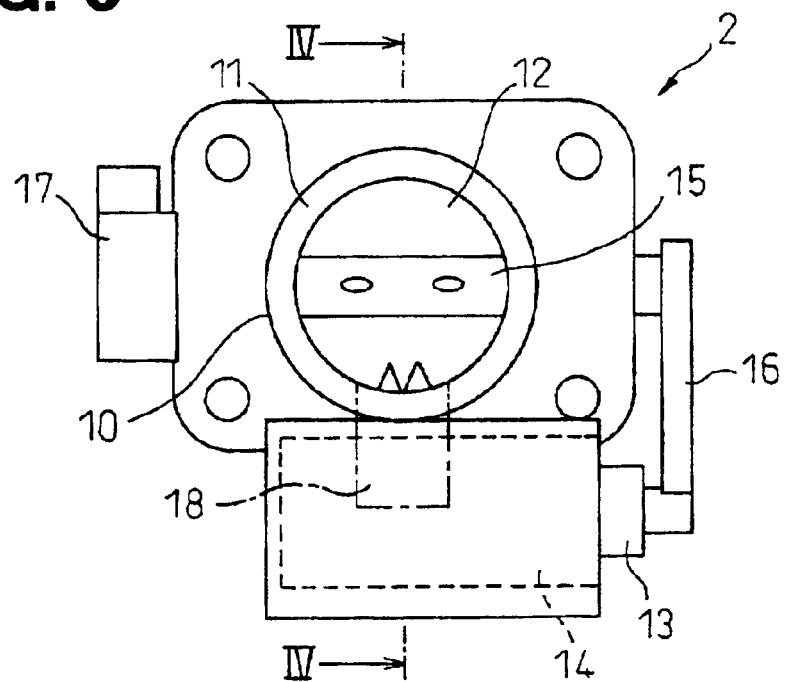
FIG. 3 is a front view schematically showing an apparatus for controlling a throttle valve with a motor according to a second embodiment of the present invention.
Figure 4:
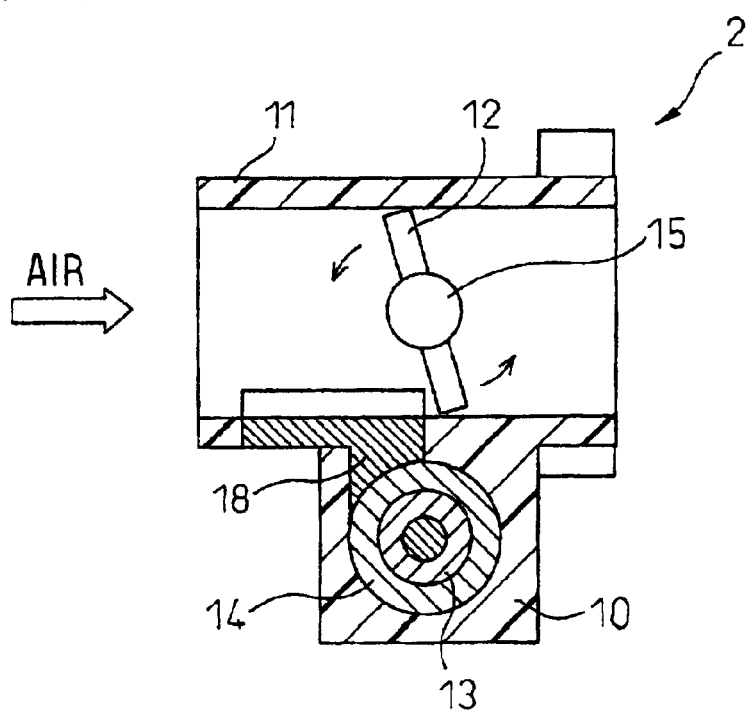
FIG. 4 is a sectional view schematically showing the apparatus taken along a section line IV—IV in FIG. 3.

Referring to FIGS. 3 and 4, in a second embodiment, an apparatus 2 has a heat conductive member. Since the basic constitution of the apparatus 2 is the same as that of the apparatus 1 of the first embodiment, the same explanation will not be repeated. In the apparatus 2, a heat conductive member 18 is arranged to come into contact with a part of the yoke 14. The heat conductive member 18 extends to an inside of the intake pipe 11 so that the heat conductive member 18 comes into contact with the flow of air flowing in the intake pipe 11. As shown in FIGS. 3 and 4, the part of the heat conductive member 18 exposed to the intake pipe 11 provides with protruding and concavities in order to increase a heat radiation area and protrudes into the intake pipe 11. The part of the heat conductive member 18 protruding to the intake pipe 11 is designed to be located in a slightly upstream side of the valve 12 and not to interfere with the rotating operation of the valve 12 as shown by arrow marks in FIG. 4. Further, as apparent from FIG. 4, a part of the heat conductive member 18 forms a part of the outer surface of the throttle valve housing 10 and is also exposed to outside air. The heat conductive member 18 is made of a member of high thermal conductivity such as a metal.

According to such a constitution, heat generated in the motor 13 is transferred to the heat conductive member 18. Since the heat conductive member 18 is exposed to the intake pipe 11, a flow of air in the intake pipe 11 comes into contact with the heat conductive member 18 to promote the heat radiation of the motor 13. According to this embodiment, since a part of the heat conductive member 18 is also exposed to the outside air, the heat of the motor is also radiated to the outside air. Therefore, a better heat radiation is obtained.

In this embodiment, although the heat conductive member 18 is exposed to both of the intake pipe 11 and the outside air, the heat conductive member 18 may be exposed to either of them. Further, according to this embodiment, the protruding and concavities for increasing the heat radiation area are formed only on the part of the heat conductive member 18 exposed to the intake pipe 11. However, similar protruding and concavities may be provided on the part exposed to the outside air.

Figure 5:
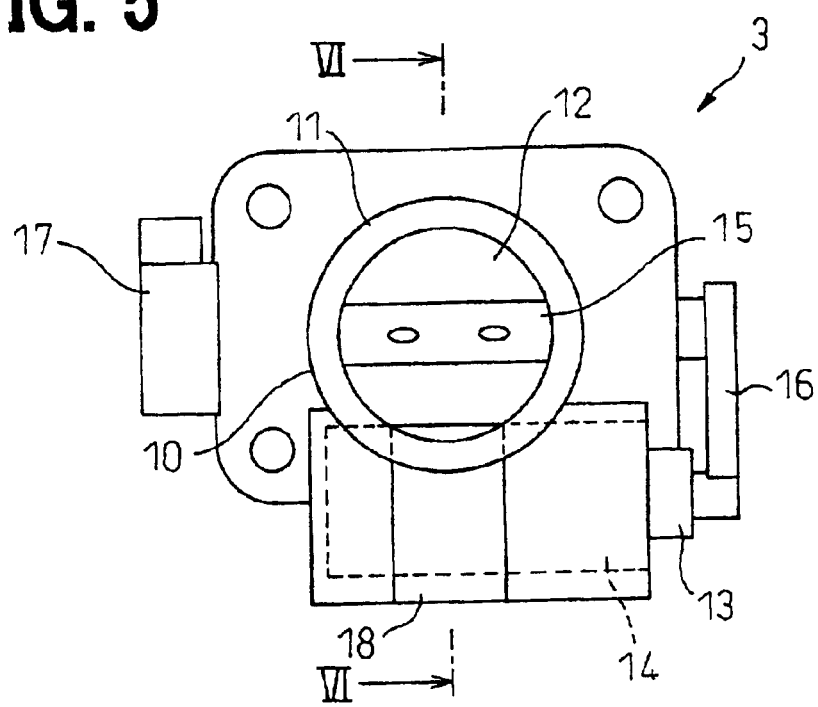
FIG. 5 is a front view schematically showing an apparatus for controlling a throttle valve with a motor according to a third embodiment of the present invention.
Figure 6:
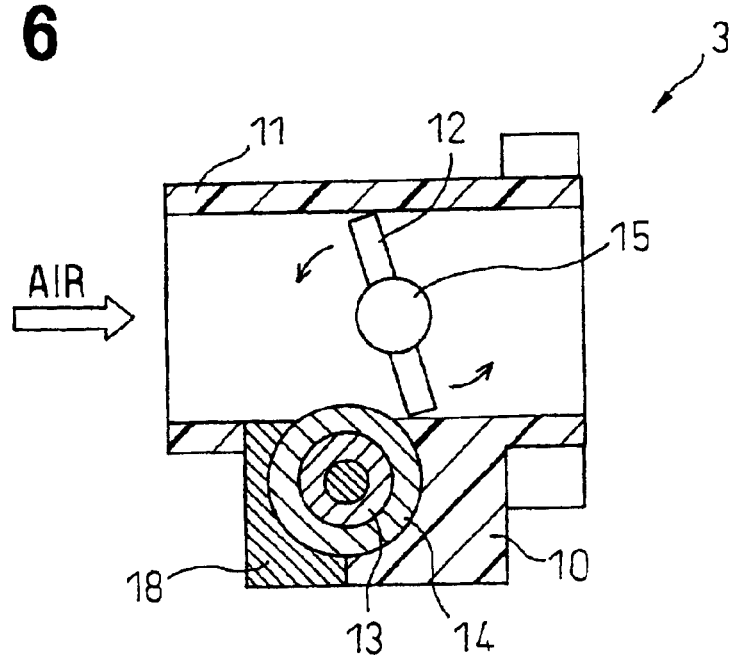
FIG. 6 is a sectional view schematically showing the apparatus taken along a section line VI—VI in FIG. 5.

An apparatus 3 according to a third embodiment of the present invention will be described below. Referring to FIGS. 5 and 6, a part of a yoke 14 is arranged so as to protrude and be exposed to an intake pipe 11. Thus, the yoke 14 directly comes into contact with the flow of air flowing in the inlet pipe. Further, in the throttle valve with a motor 3, the heat conductive member 18 is arranged to come into contact with a part of the yoke 14, and the heat conductive member 18 extends to be exposed to the intake pipe 11 to come into contact with the flow of air flowing in the intake pipe 11. According to this embodiment, although only the yoke 14 protrudes to the intake pipe 11, the part of the heat conductive member 18 exposed to the intake pipe 11 may also protrude to the intake pipe 11 similarly to the second embodiment. The part of the yoke 14 protruding to the intake pipe 11 is designed to be located in a slightly upstream side of a valve 12 and not to interfere with the rotating operation of the valve 12. As apparent from FIG. 6, a part of the heat conductive member 18 forms a part of the outer surface of the throttle valve housing 10 and is also exposed to outside air.

According to the above-described constitution, the same effect is obtained as the first embodiment and the second embodiment. Therefore, the heat radiation is improved compared with those of other embodiments described above.

In the embodiment, although the heat conductive member 18 is exposed to both the intake pipe 11 and the outside air, the heat conductive member may be exposed to only one of them. Further, in the embodiment, although protruding parts and concavities are not especially formed on the parts of the heat conductive member 18 exposed to the intake pipe 11 and to the outside air, the protruding parts and concavities for increasing the heat radiation area as described in the second embodiment may be formed on both or one of these parts.

Further, according to the above-described embodiments, one or both of the portion of the yoke 14 exposed to the inside of the intake pipe 11 and the portion of the heat conductive member 18 exposed to the inside of the intake pipe 11 is disposed to a vicinity of the valve 12, as shown in the corresponding figures. By arranging as described above, it is possible to prevent the valve 12 from the icing malfunction since the vicinity of the valve 12 is heated by heat from the motor 13.

Figure 7:
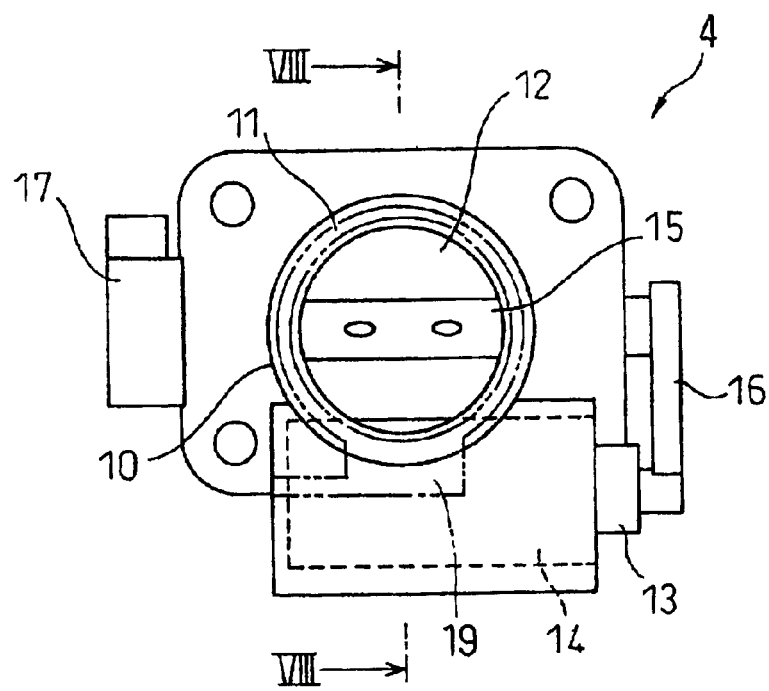
FIG. 7 is a front view of an apparatus for controlling a throttle valve with a motor according to a fourth embodiment of the present invention.
Figure 8:
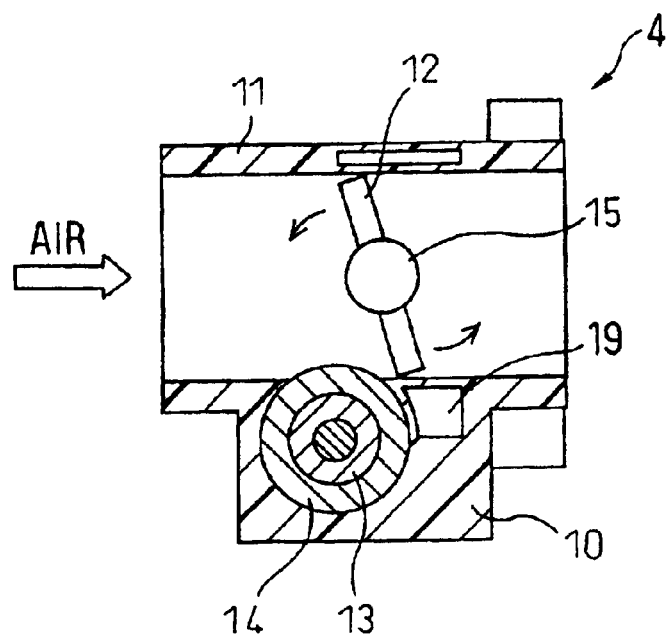
FIG. 8 is a cross-sectional view schematically showing the apparatus taken along a section line VIII—VIII in FIG. 7.
Figure 9:
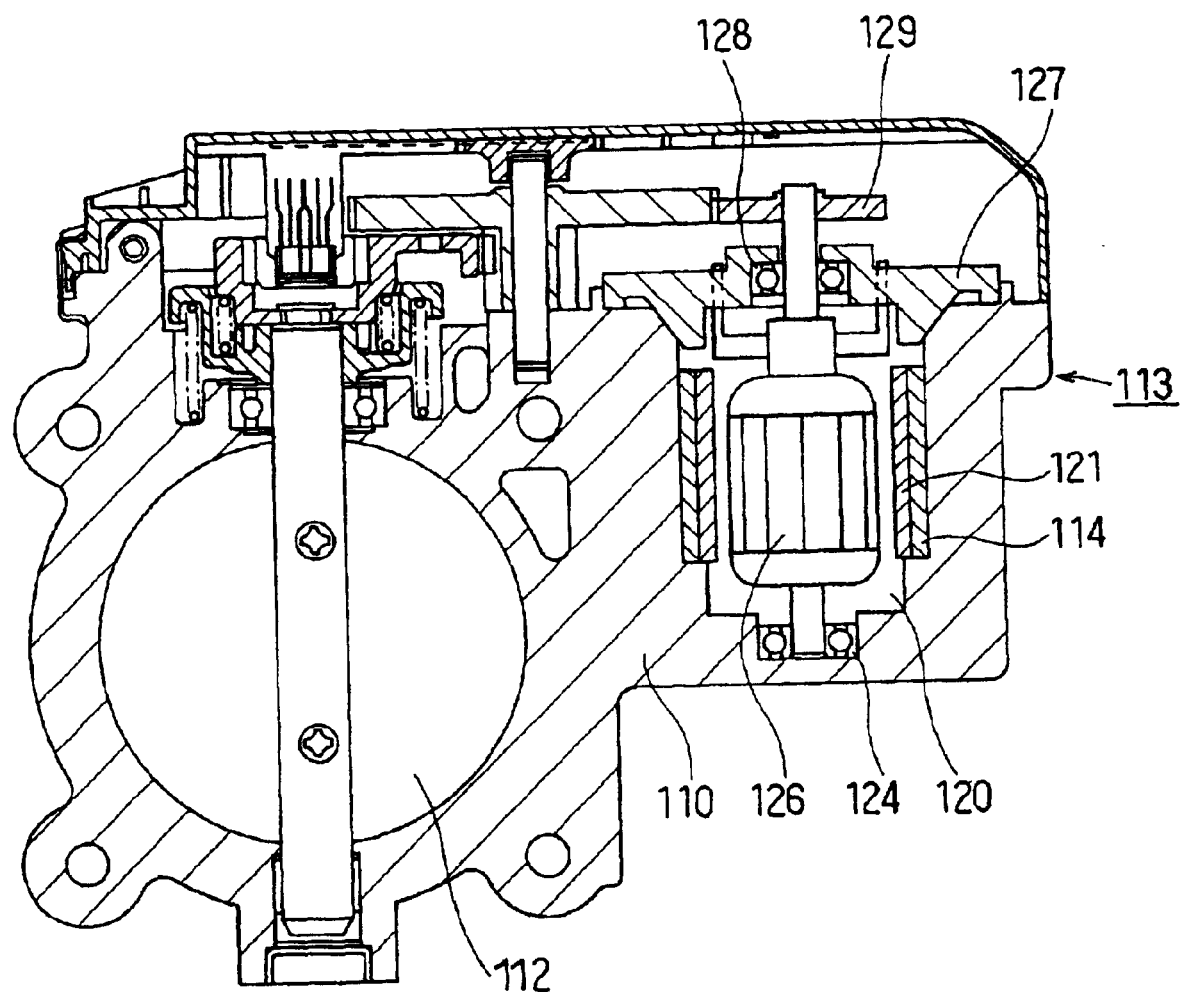
FIG. 9 is a sectional view schematically showing the entire body of an apparatus for controlling a throttle valve with a motor according to a fifth embodiment of the present invention.

A fourth embodiment will be explained. Referring to FIGS. 7 and 8, the yoke 14 directly contacts with airflow in the intake pipe since a part of the yoke 14 is disposed to protrude and expose to the intake pipe 11. The portion of the yoke 14 protruding to the intake pipe 11 is located on a slightly upstream side of the valve 12, and is constructed so as not to collide with a rotation of the valve 12.

Especially for this embodiment, the ring-shaped hollow portion, the ring passage 19, is arranged in the pipe wall that construct the intake passage so as to surround the valve 12 disposed in the intake pipe 11 as shown in FIGS. 7 and 8. The ring passage 19 is arranged so that a part thereof passes through a vicinity of the motor 13 as shown in FIG. 8. A heat conductive medium, e.g. an engine coolant, passes the ring passage 19 through.

By arranging as described above, in addition to the similar advantage of helping heat dissipation by being directly contact the yoke 14 with the air flow in the intake pipe 11, two advantages of helping heat dissipation from the motor 13 and preventing the valve 12 from the icing malfunction are achieved by the heat conductive medium flowing through the ring passage 19. That is, if the valve may be frozen since the surroundings of the valve 12 is cold, e.g. in case of low temperature, the surroundings of the valve is heated by the heat conductive medium flowing in the ring passage 19. Therefore the valve 12 is prevented from the icing malfunction. On the other hand, if the temperature of the motor 13 rises, heat dissipation from the motor is improved by transferring heat from the motor 13 to the heat conductive medium, since the part of the ring passage 19 is arranged to pass through the vicinity of the motor 13. A temperature of the heat conductive medium flowing in the ring passage 19 may be controlled so as to accomplish the advantages.

Since the ring passage 19 is arranged to surround the valve 12 disposed within the intake pipe 11, it is possible to prevent the valve from the icing malfunction reliably by heating an entirety of surroundings of the valve 12 sufficiently, even if, for example the throttle valve housing is made of a low heat conductive resin or the like.

Although the engine coolant is utilized to pass through the ring passage 19 in this embodiment, another heat conductive medium such as another hot water or a heated air may be utilized.

Incidentally, although the throttle valve housing having the above described ring shaped hollow portion (ring passage) 19 can be manufactured by using the known several method. For example, it is possible to obtain the above described ring passage 19 within the throttle valve housing by composing the throttle valve housing by two portions separated at a surface perpendicular to an axis of the intake pipe 11 where the ring shaped hollow portion 19 is separated into halves, and assembling them to match ring grooves formed on respective portions. Further, a unitary and seamless throttle valve housing may be provided by forming the hollow portion utilizing a resin blow forming method or a lost-wax resin forming method using a lost-wax type core or the like.

The arrangement of this embodiment may be combined with the arrangement having the heat conductive member 18 described in the description of the second and third embodiment, in case of that, heat dissipation from the motor 13 is more improved.

As described above, the heat radiation of the motor is improved by a simple and inexpensive means by a simple structural change that does not need any additional members, and such as a simple structural change and an additional heat conductive member. Therefore, since it is possible to prevent the deterioration of torque due to the superheat of the motor, the compact motor whose torque is the smaller for the conventionally expected deterioration of torque can be set. The entire body of the throttle valve with a motor is made compact. Further, by using the similar means, on the other hand, it is possible to prevent the valve from the icing malfunction by using heat generated by the motor. Additionally, it is possible to prevent the valve from the icing malfunction reliably and to improve heat dissipation of the motor by arranging the ring passage to surround the valve and flowing the heat conductive medium therein.

In the above-described embodiments, although the motor is disposed in the upstream side of the valve, it is to be understood that similar effects may be obtained even when the motor is disposed in a downstream side of the valve.

Figure 10:
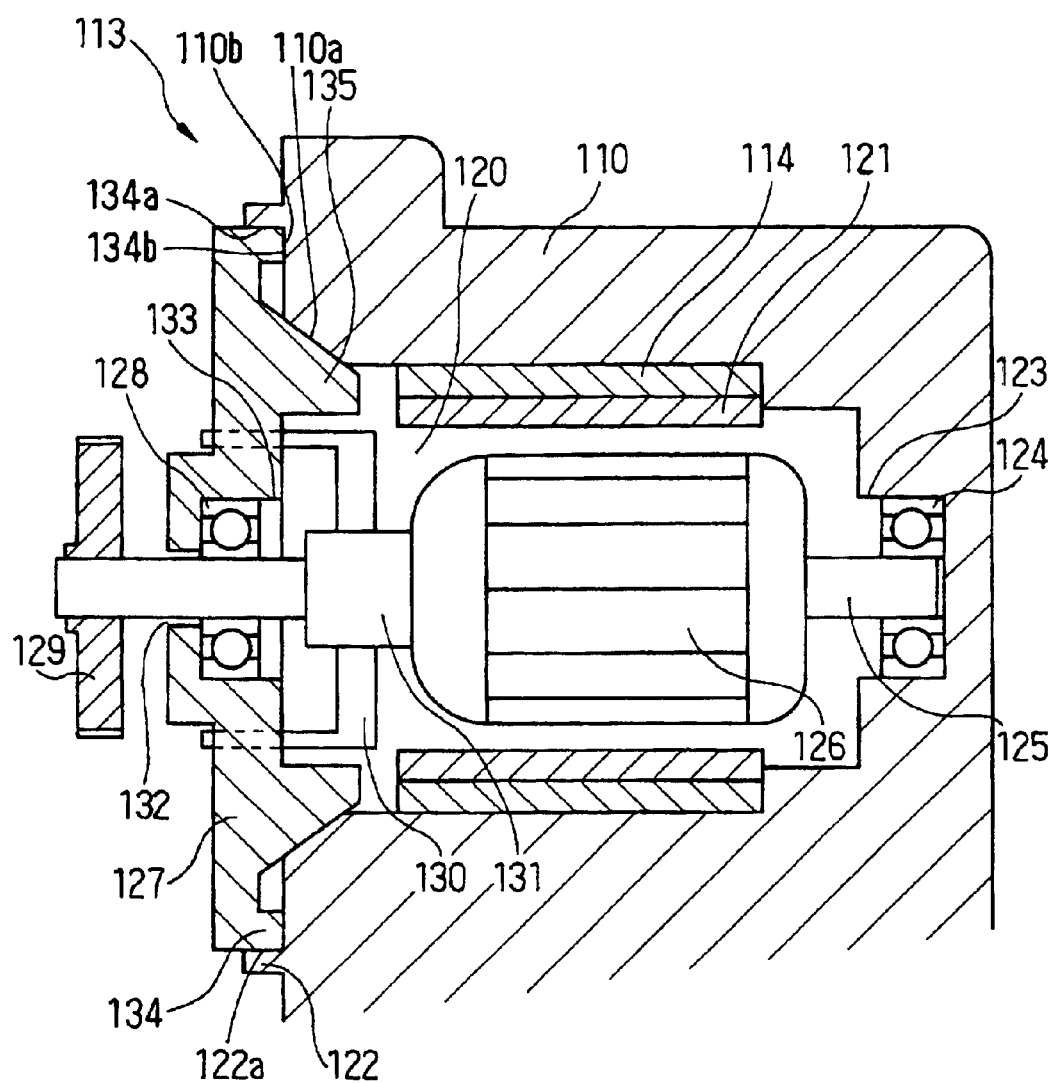
FIG. 10 is an enlarged sectional view schematically showing the motor shown in FIG. 9.

A fifth embodiment of an apparatus for controlling a throttle valve will be described with reference to FIGS. 9, 10, 11A and 11B. In an apparatus 113, a substantially cylindrical concavity 120 is provided in a part of a body member 110 for accommodating the throttle valve 112 and forming a part of a motor housing. In this embodiment, the body member 110 is made of resin. As shown in FIG. 10, a cylindrical yoke 114 of which both ends are opened is fixed to the inside surface of the concavity 120 provided in a part of the body member 110. A magnet 121 is fixed to the inside surface of the yoke 114.

In the concavity 120, a surface 110a inclined to be widened outward is provided in the peripheral part of an opening part thereof. In the outer peripheral side of the inclined surface 110a, an attachment reference plane 110b substantially perpendicular to the inside wall of the concavity 120 is further extended. Further, in the outer peripheral side thereof, a positioning frame 122 as an annular protruding part is provided. On the bottom part of the concavity 120, a small concavity 123 is further formed and a bearing 124 in a counter-output side is received in and attached to the small concavity. An armature 126 having a rotation shaft 125 is accommodated in the concavity 120 in which the yoke 114 and the magnet 121 are installed. At this time, a part of the rotation shaft 125 in the counter-output side is received and supported by the bearing 124 in the counter-output side to be capable of rotating.

On the other hand, a part of the rotation shaft 125 in an output side is supported by a bearing 128 in the output side to be capable of rotating. The bearing 128 in the output side is disposed in a bearing holder member 127 attached so as to cover up the concavity 120 in which the armature 126 is accommodated. The part of the rotation shaft 125 in the output side passes through the bearing holder member 127 as well as the bearing 128 in the output side. The end part of the part of the rotation shaft 125 in the output side provides with a motor gear 129 for connecting it to power transmitting means in order to transmit the output of the motor to the throttle valve 112.

Figure 11A:
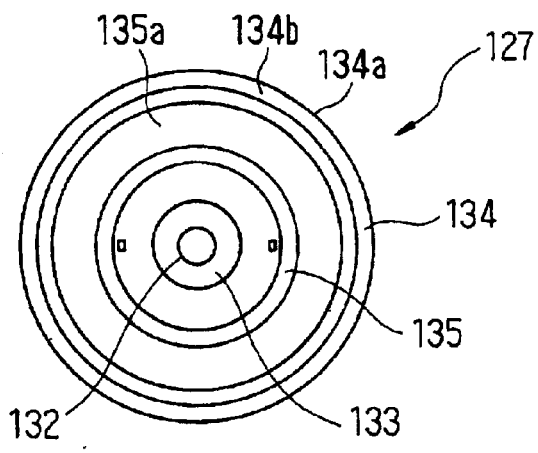
FIG. 11A shows the attached side surface of a bearing holder member shown in FIG. 10.
Figure 11B:
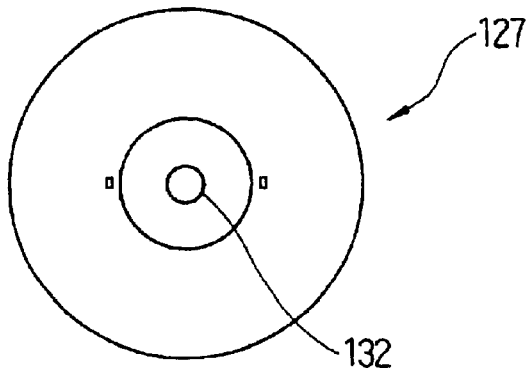
FIG. 11B shows a side surface opposite to FIG. 11A, that is, an outer side surface.

FIGS. 11A and 11B respectively show the attached side surface of the bearing holder member 127 (that is, a side surface to be attached to the body member 12) and a side surface opposite thereto (that is, an outer side surface). The bearing holder member 127 is substantially disk shaped and is made of the same resin as that of the body member 110. As shown in FIG. 10, in this embodiment, brushes 130 are attached to the bearing holder member 127. That is, the bearing holder member 127 serves as a brush holder for holding the brushes 130 at a proper position and allowing the brushes 130 to assuredly come into contact with a commutator 131. The bearing holder member 127 has a through hole 132 through which the rotation shaft 125 passes on its central part.

In the periphery of the through hole 132 in the attached side surface side, a concavity 133 is provided to receive the bearing 128 in the output side. In the outermost peripheral part of the attached side surface of the bearing holder member 127, an annular positioning protrusion 134 is provided. The positioning protrusion 134 has an outside surface 134a forming an alignment reference surface of the bearing holder member 134, and a top surface 134b forming an attachment height reference surface. In other words, the outside surface 134a is engaged with the inside surface 122a of the annular positioning frame 122. Further, the top surface 134b abuts on the attachment reference plane 110b inwardly adjacent to the positioning frame 122.

On the attached side surface of the bearing holder member 127, an annular welding protrusion 135 is provided so as to correspond to the peripheral part of the opening of the concavity 120. More specifically, the outer side surface 135a of the welding protrusion 135 is inclined so that its width becomes narrower as it comes nearer to a top end of the protrusion 135. The inclined surface 135a is located at a position corresponding to the inclined surface 110a. Further, since a part of the welding protrusion 135 enters the concavity 120, the welding protrusion 135 is higher than that of the positioning protrusion 134.

When the bearing holder member 127 is attached to the body member 110, the inclined surface 135a of the welding protrusion 135 is welded to and stuck to the inclined surface 110a of the body member 110 by a resin welding process. In the resin welding process, both of the inclined surface 110a and 135a are melted and then set continuously.

In the embodiment, since the body member 110 and the bearing holder member 127 are made of the same resin material, they are simply welded, stuck and fixed to each other by a resin welding method. Further, the bearing holder member 127 is precisely positioned in accordance with the above-described operations of the positioning protrusion 134 and the positioning frame 122 and the like.

The attachment of the bearing holder member 127 to the body member 110 by the welding method can decrease the number of parts and the number of assembly steps, compared with the attachment of a bearing holder member to a body member by means of conventional screws or bolts. The above-described constitution can contribute to the decrease of the manufacture cost of the apparatus for controlling the throttle valve with a built-in motor.

Figure 12:
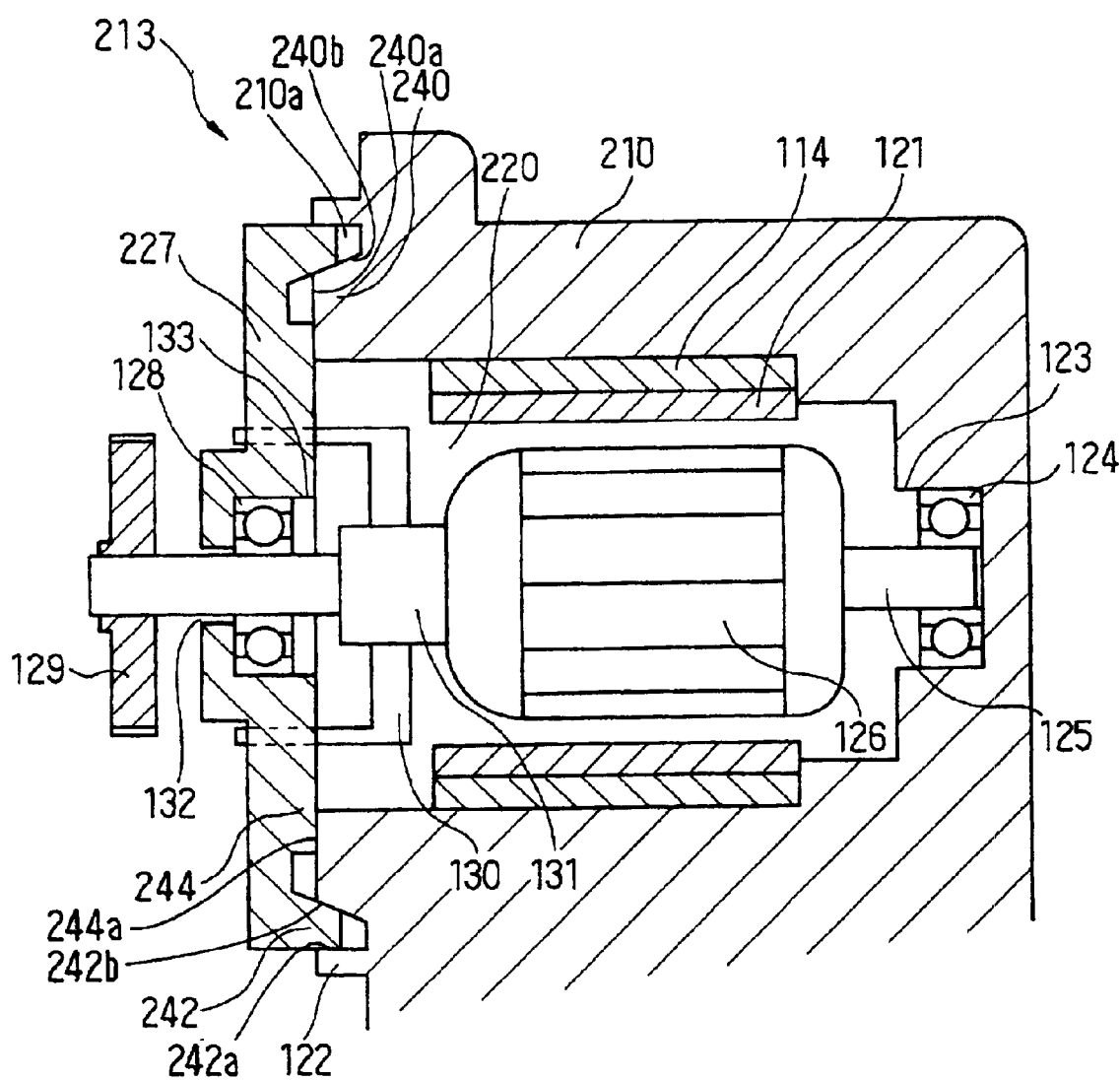
FIG. 12 is an enlarged sectional view schematically showing a motor according to a sixth embodiment of the present invention.

FIG. 12 shows a sixth embodiment of an apparatus 213. The apparatus 213 is the same as the apparatus 113 shown in the first embodiment except the constitution of a bearing holder member 227 and the constitution of a part of a body member 210.

An annular protrusion 240 is provided adjacently the periphery of the opening of a concavity 220 provided in the body member 210 in which an armature 126 is accommodated. A top surface 240a of the protrusion 240 forms an attachment reference plane. The inside surface of the protrusion 240 forms a part of the inner side surface of the concavity 220, and is substantially perpendicular to the attachment reference plane.

As shown in FIG. 12, an outside surface 240b of the protrusion 240 is inclined so that the lower part of the protrusion 240 is widened outward. In the outer part of the annular protrusion 240, an annular positioning frame 122 is further provided. An annular groove 210a is formed between the protrusion 240 and the positioning frame 122.

Figure 13A:
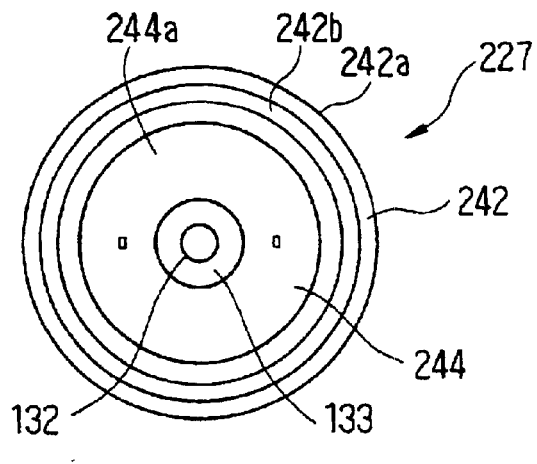
FIG. 13A shows the attached side surface of a bearing holder member shown in FIG. 12.
Figure 13B:
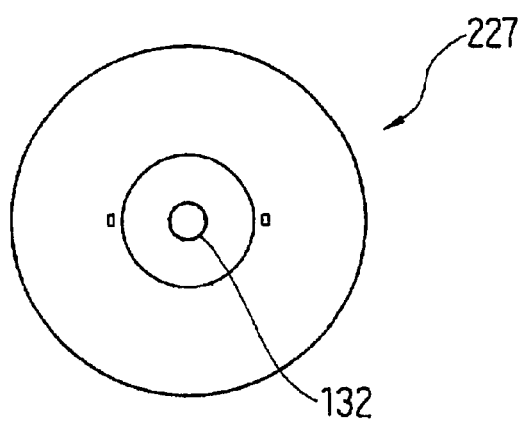
FIG. 13B shows a side surface opposite to FIG. 13A, that is, an outer side surface.

FIGS. 13A and 13B respectively show the attached side surface of the bearing holder member 227 and a side surface opposite thereto. The bearing holder member 227 is substantially disk shaped, like the bearing holder member 127 of the first embodiment. The bearing holder member 227 has the through hole 132 through which the rotation shaft 125 passes on its central part. In the periphery of the through hole 132 in the attached side surface side, the concavity 133 is provided to receive the bearing 128.

In the bearing holder member 227, an annular flat protrusion 244 is provided in the periphery adjacently the opening of the concavity 133. The top surface 244a of the protrusion 244 forms the attachment height reference surface of the bearing holder member 227. The inside surface of the protrusion 244 forms a part of the inner side surface of the concavity 133. The protrusion 244 is extended to a range that when the bearing holder member 227 is attached to the body member 210, at least a part of the top surface 244a abuts on the top surface 240a of the protrusion 240 of the body member 210. The top surface 240a abuts on the top surface 244a so that a positioning operation in the direction of height (right and left directions in FIG. 12) is carried out.

In the outermost peripheral part of the bearing holder member 227, an annular positioning and welding protrusion 242 is provided. The outside surface 242a of protrusion 242 is engaged with the positioning frame 122 provided on the body member 210. The engagement makes it possible to align the bearing holder member 227. On the other hand, the inside surface 242b of the protrusion 242 is inclined so as to correspond to the inclined surface 240b of the body member 210. That is, while the bearing holder member 227 is attached to the body member 210, the protrusion 242 of the bearing holder member 227 is fitted to the groove 210a.

When the bearing holder member 227 is attached to the body member 210, the inclined surface 242b of the bearing holder member 227 is welded to and stuck to the inclined surface 240b of the body member 210. In the embodiment, the body member 210 and the bearing holder member 227 are made of the same resin material, and they are simply welded, stuck and fixed to each other by a resin welding method. Further, as mentioned above, the bearing holder member 227 is precisely positioned.

Further, in this embodiment, when the protrusion 240 abuts on the protrusion 244 inward the welding part, and the output side of the motor is disposed in an upper part (that is, when the bearing holder member 227 side is disposed in the upper part), the inclination of the welding part descends outward, so that molten resin does not enter the concavity 220. In other words, there are formed the welding part having the inclined surface 240a formed so as to allow the molten resin to flow outward, and having molten resin entry preventing means including the abutting part of a part of the bearing holder member 227 and a part of the body member 210, in which the part is located inward the welding part. In such a manner, since the molten resin is prevented from entering the motor, a manufacture is facilitated and the quality is improved due to the deterioration of failure rate in a motor part.

Figure 14:
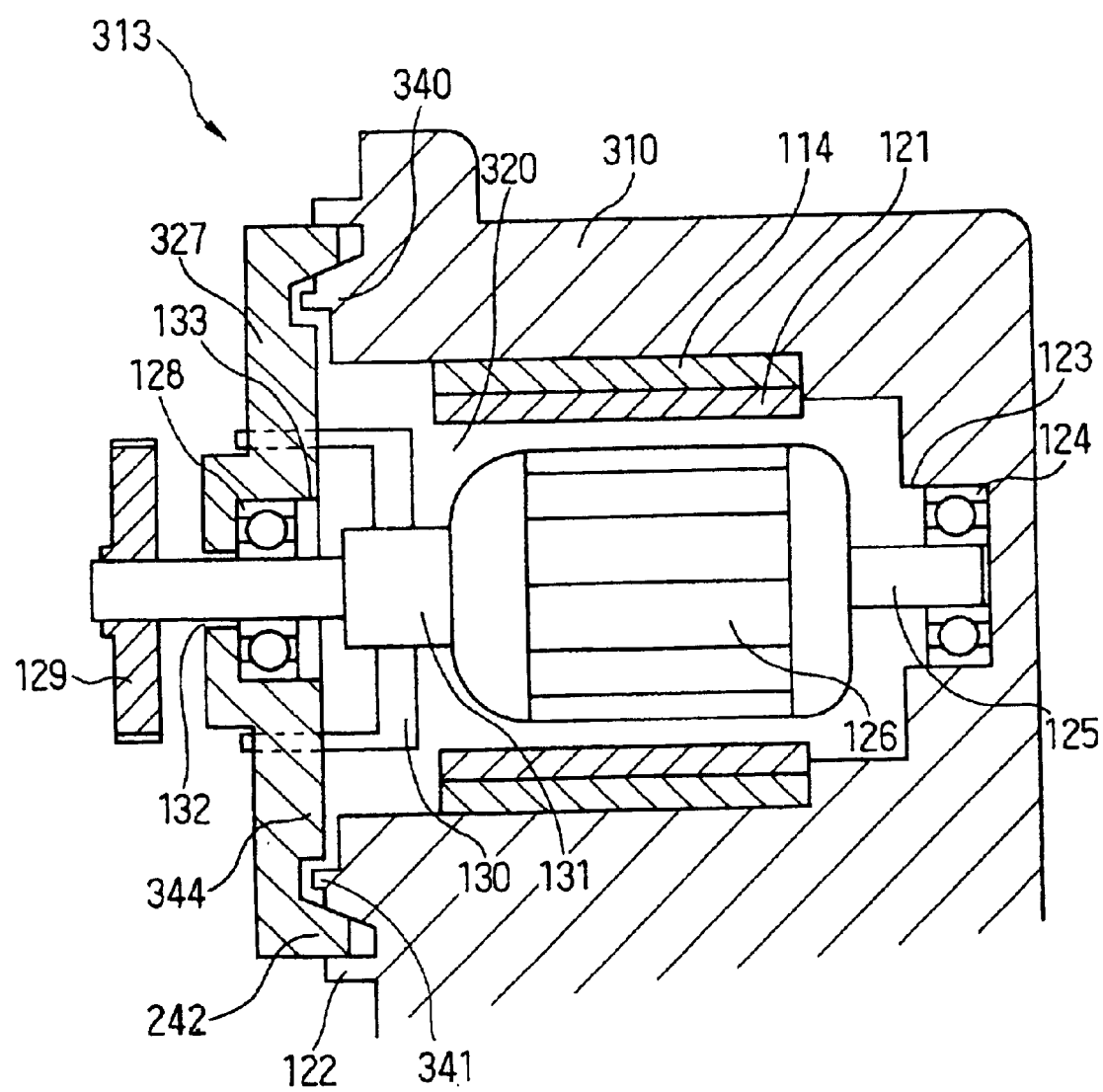
FIG. 14 is an enlarged sectional view schematically showing a motor according to a seventh embodiment of the present invention.

FIG. 14 shows a seventh embodiment of an apparatus 313. The apparatus 313 is substantially the same as the apparatus 213 disclosed in the sixth embodiment except for an arrangement of a portion where a bearing holder member 327 and a body member 310 are joined.

A ring like protrusion 340 and a ring like small protrusion 341 are located as shown in FIG. 14. The protrusion 340 is located next to an opening of a concavity 320. The protrusion 340 surrounds the opening. The small protrusion 341 is provided by extending a portion of the body member 310 further from a top surface of the protrusion 340. The small protrusion 341 provides a dam portion for damming molten resin flow when the bearing holder member 327 is welded on the body member 310. The protrusion 340 corresponds to the protrusion 240 in the sixth embodiment.

The arrangement and the functions of the parts of the bearing holder 327 in this embodiment are substantially the same as those of the sixth embodiment. Therefore, the explanation will not be repeated.

In this embodiment, a top surface of the ring shaped protrusion 344 is arranged to be not contact with a top surface of the protrusion 340 of the body member 310 as shown in FIG. 12.

Attaching the bearing holder member 327 to the body member 310 is performed by welding inclined surfaces on the protrusions 242 and 340. It is possible to fix them easily by the welding process since the body member 310 and the bearing holder member 327 are made of the same resin in this embodiment too. Also, it is possible to fix the bearing holder member 327 with an accurate positioning.

A dam for damming molten resin that flows out from the portions for fixing the body member 310 and the bearing holder member 327 when the welding process is carried out is provided. Thereby, it is possible to ease the manufacturing and to improve a quality such as a reducing failure rate of the motor.

Although the embodiment employs both of the arrangements, the inclined surfaces and the dam, it is possible to employ only one of those arrangements as a means for preventing a leak of the molten resin.

Figure 15:
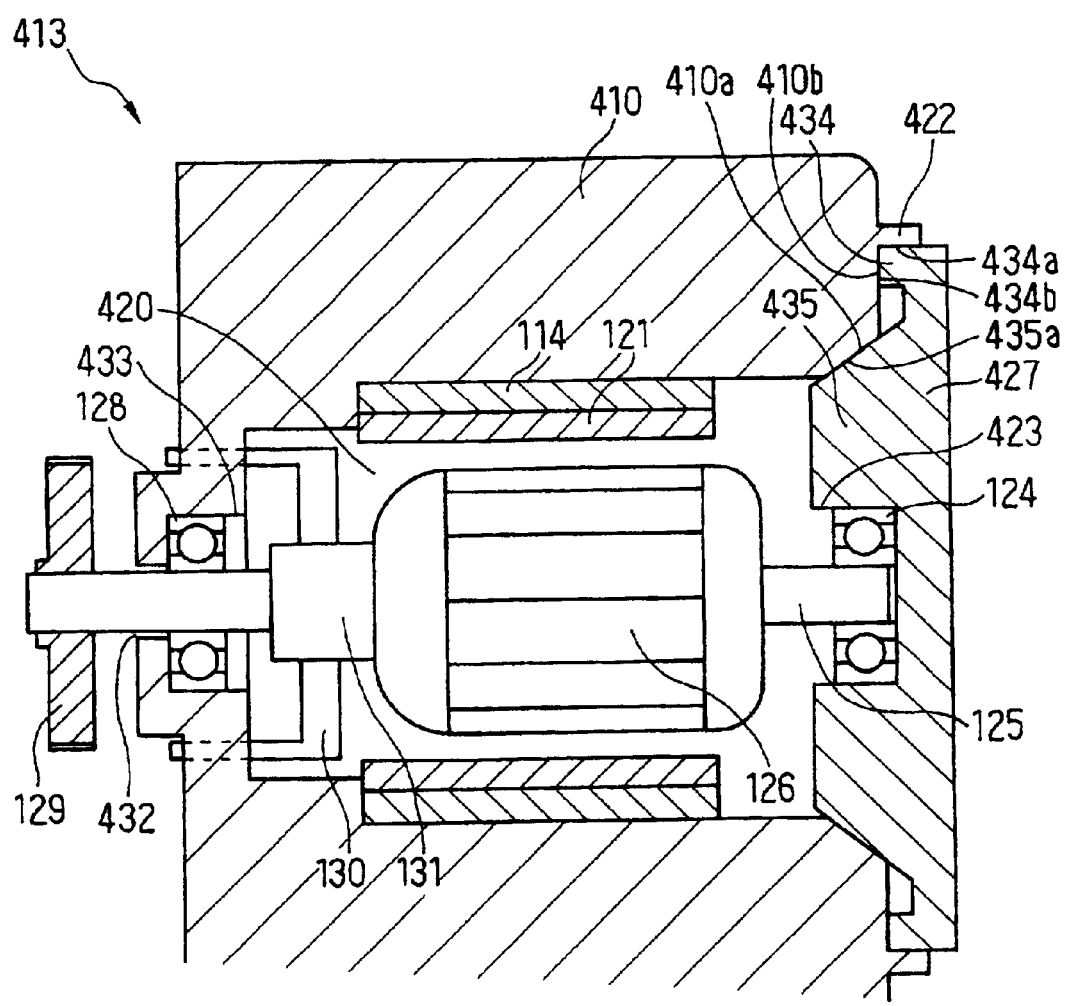
FIG. 15 is an enlarged sectional view schematically showing a motor according to a eighth embodiment of the present invention.

FIG. 15 shows an eighth embodiment of an apparatus. The apparatus 413 has a bearing holder member 427 on a counter-output side. The bearing 128 in the output side is directly attached to a body member 410 and the bearing 124 in the counter-output side is attached to a bearing holder member 427 which is welded, stuck and fixed to the body member 410.

A substantially cylindrical concavity 420 is provided in the body member 410. In this embodiment, the body member 410 and the baring holder member 427 are made of the same resin.

A inclined surface 410a to be widened outward is provided in the peripheral part of an opening of the concavity 420. An attachment reference plane 410b substantially perpendicular to the inside wall of the concavity 420 is further extended. Further, in the outer peripheral side thereof, a positioning frame 422 as an annular protruding part is provided.

On the bottom part of the concavity 420, a hole 432 through which the output side of the rotation shaft 125 passes is provided at its center, a small concavity 433 is formed in the periphery of the through hole 432 and the bearing 128 is received in and attached to the concavity 433. Further, the brushes 130 are attached to the bottom part of the concavity 420. The brushes 130 are held at a suitable position to allow the brushes to assuredly come into contact with a commutator 131. The armature 126 having the rotation shaft 125 is accommodated in the concavity 420 in which the yoke 114 and the magnet 121 are installed. At this time, the output side part of the rotation shaft 125 passes through the bearing 128 and is supported to be capable of rotating and passes through the through hole 432. The motor gear 129 is attached on the end of the rotation shaft 125.

On the other hand, the counter-output side part of the rotation shaft is supported by the bearing 124 to be capable of rotating. The bearing 124 is disposed in the bearing holder member 427 attached so as to cover up the concavity 420.

Figure 16A:
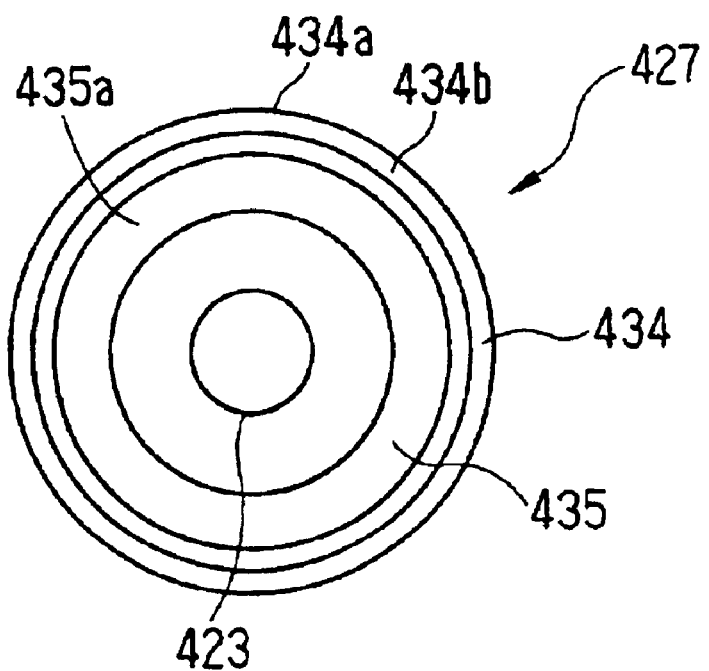
FIG. 16A shows the attached side surface of a bearing holder member shown in FIG. 15.
Figure 16B:
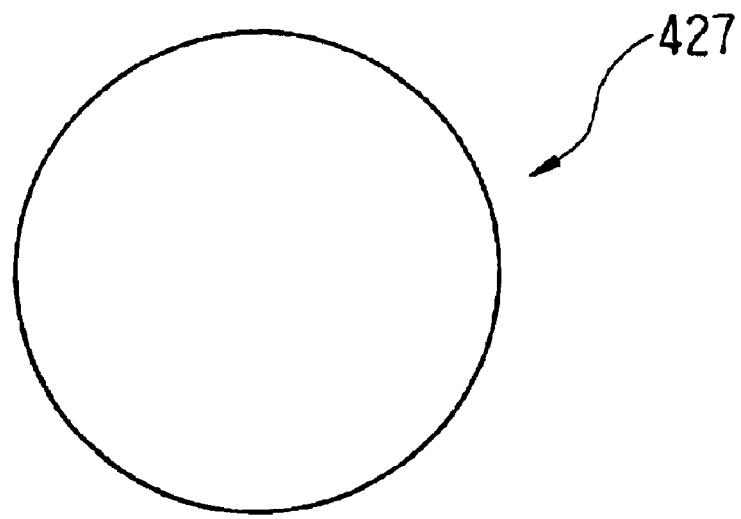
FIG. 16B shows a side surface opposite to FIG. 16A, that is, an outer side surface.

FIGS. 16A and 16B respectively show the attached side surface of the bearing holder member 427 and a side surface opposite thereto. The bearing holder member 427 is substantially disk shaped and is made of the same resin as that of the body member 410. In this embodiment, the bearing holder member 427 has a concavity 423 provided at the central part of the attached side surface to receive the bearing 124. In the outermost peripheral part of the attached side surface of the bearing holder member 427, an annular positioning protrusion 434 is provided. The positioning protrusion 434 has outside surface 434a forming an alignment reference surface of the bearing holder member 427 and top surface 434b forming an attachment height reference surface. The outside surface 434a engages with the inside surface of the annular positioning frame 422 provided around the opening part of the concavity 420 to align the bearing holder member 427. Therefore, an alignment between the rotation shaft 125 and the counter-output side bearing 124 supported on the bearing holder member 427 is carried out. Further, the top surface 434b (that is, a surface facing the body member 410 to which the positioning protrusion is attached) abuts on an attachment reference plane 410b inwardly adjacent to the positioning frame 422 to position the bearing holder member 427 in the direction of height.

An annular welding protrusion 435 is provided so as to correspond to the peripheral part of the opening part of the concavity 420. More specifically, the welding protrusion 435 has its outside surface 435a inclined so that its width becomes narrower as it comes nearer to the end of the protrusion 435. The inclined surface 435a is located at a position corresponding to the inclined surface 410a. Further, since a part of the welding protrusion 435 enters the opening part of the concavity 420, the height of the welding protrusion 435 is higher than that of the positioning protrusion 434.

When the bearing holder member 427 is attached to the body member 410, the inclined surfaces 410a and 435a are welded. The means for preventing the concavity form entering the molten resin may be also applied to the eighth embodiment.

Figure 17:
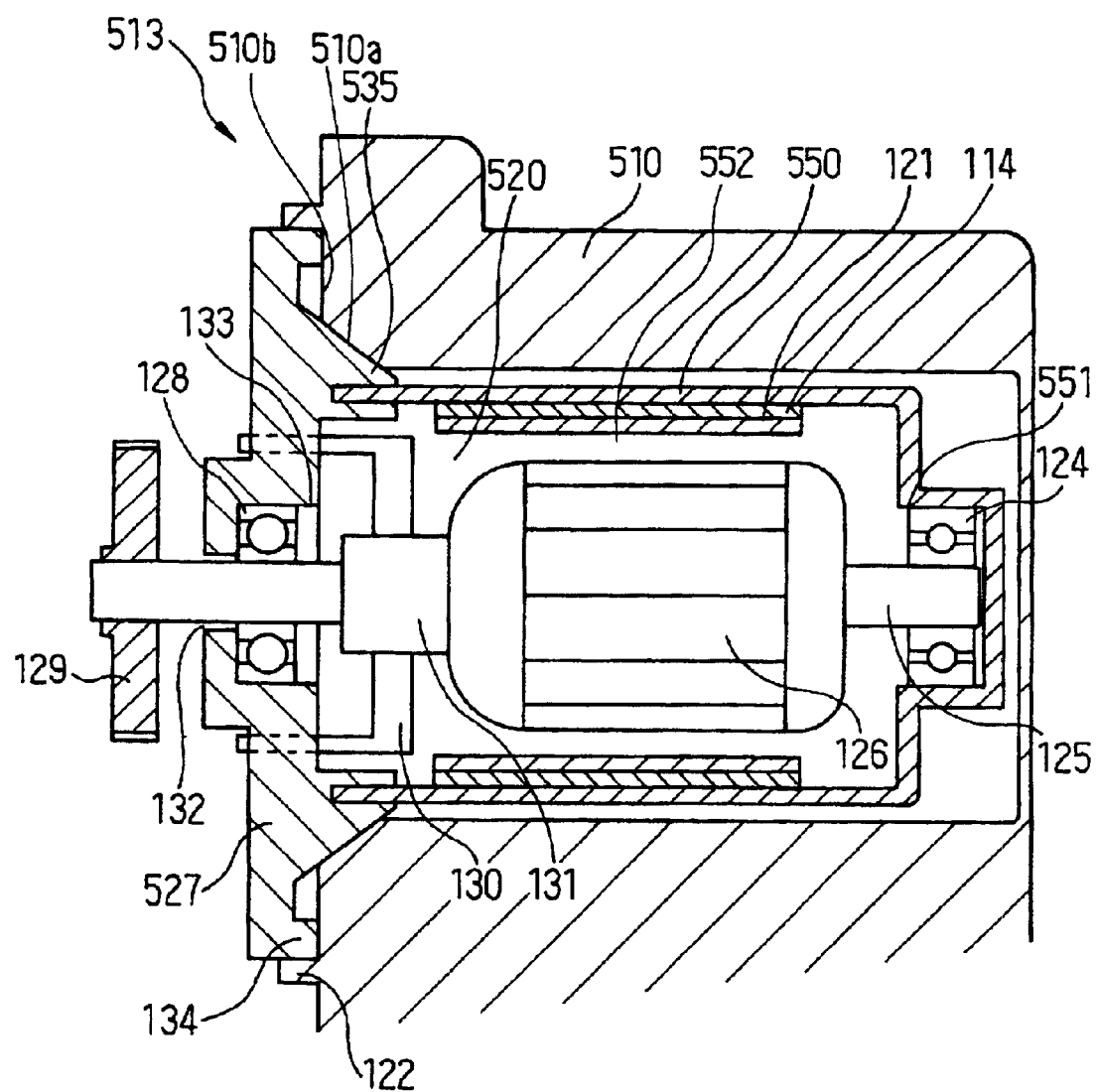
FIG. 17 is an enlarged sectional view schematically showing a motor according to a ninth embodiment of the present invention.

A ninth embodiment of an apparatus 513 is shown in FIG. 17. The apparatus 513 of the embodiment is the same in an aspect that the motor components are housed in a concavity 520 that is substantially cylindrical and is formed in a body member 510. However, the embodiment employs an arrangement in which a motor housing 550 houses the other motor components and is housed in the concavity 520 as shown in FIG. 17.

In detail, the motor housing 550 is cup-shaped and performs to assemble the motor components on predetermined positions therein and to support the motor components integrally. The yoke 114 is fixed on an inside surface of the motor housing 550, and the magnet 121 is fixed on an inside surface of the yoke 114. The counter-output side bearing 124 is housed and fixed in a small concavity 551 formed on a bottom of the motor housing 550. The armature 126 having the rotation shaft 125 is housed in an inner space 552 of the motor housing 550 where the yoke 114 and the magnet 121 are disposed.

When the armature 126 is housed in the motor housing 550, a counter-output side end of the rotation shaft 125 is received and supported by the counter-output side bearing 124. The output side bearing 128 disposed in the bearing holder member 527 rotatably supports an output side end of the rotation shaft 125. The bearing holder member 527 is attached on the cup-shaped motor housing 550 with the armature 126 so as to cover the motor housing 550. The output side end of the rotation shaft 125 is disposed to pass through the output side bearing 128 and the bearing holder member 527, and a motor gear 129 for linking with a power transmitting means and transferring an output of the motor to the throttle valve is attached on a distal end thereof.

A surface 510a inclined to enlarge toward radial outside is formed on a radial outside of an opening of the concavity 520. An assembling reference plane surface 510b which is substantially perpendicular to an inside wall of the concavity 520 is formed and extended on a radial outside of the inclined surface 510a. A positioning frame 122, which is a ring shaped protrusion, is disposed on a radial outside of the assembling reference plane surface 510b. The body member 510 is also made of resin in this embodiment.

The arrangement and the functions of the parts of the bearing holder 527 in this embodiment are substantially the same as those of the bearing holder member 127 of the first embodiment. Therefore, the explanation will not be repeated. However, in this embodiment, differently from the case of the first embodiment, the motor housing 550 is attached on the end surface of the welding protrusion 535 as shown in FIG. 17. During an assemble of the apparatus 513, first the motor housing 550 housing the component of the motor is attached on the bearing holder member 527, then the bearing holder member 527 is attached on the body member 510 so that the motor housing 550 is housed in the concavity 520.

Attaching the bearing holder member 527 to the body member 510 is performed by a resin welding process as well as the first embodiment.

As described above, according to the embodiments, the apparatus for controlling the throttle valve, especially a motor apparatus, is assembled by welding the bearing holder member to the body member. Therefore, the number of parts and the number of assembling steps are decreased compared with the conventional case in which the small machine screws or bolts are used, which can contribute to the decrease of the manufacture cost.

The bearing holder member and the body member may be made of material such as PBT (Polybutylene terephthalate) and PPS (Polyphenylene sulfide) which are categorized in a thermoplastic engineering resin.

The welding between the bearing holder member and the body member may be carried out by methods such as a laser welding, an ultrasonic welding and a vibrating welding.

Although the embodiments are the throttle valve, that is the apparatus for controlling the throttle valve, the present invention may be implemented on a motor apparatus for other purposes. Although the examples of a DC motor are given, equivalent effects may be obtained by other motors such as a step motor.

Figure 18:
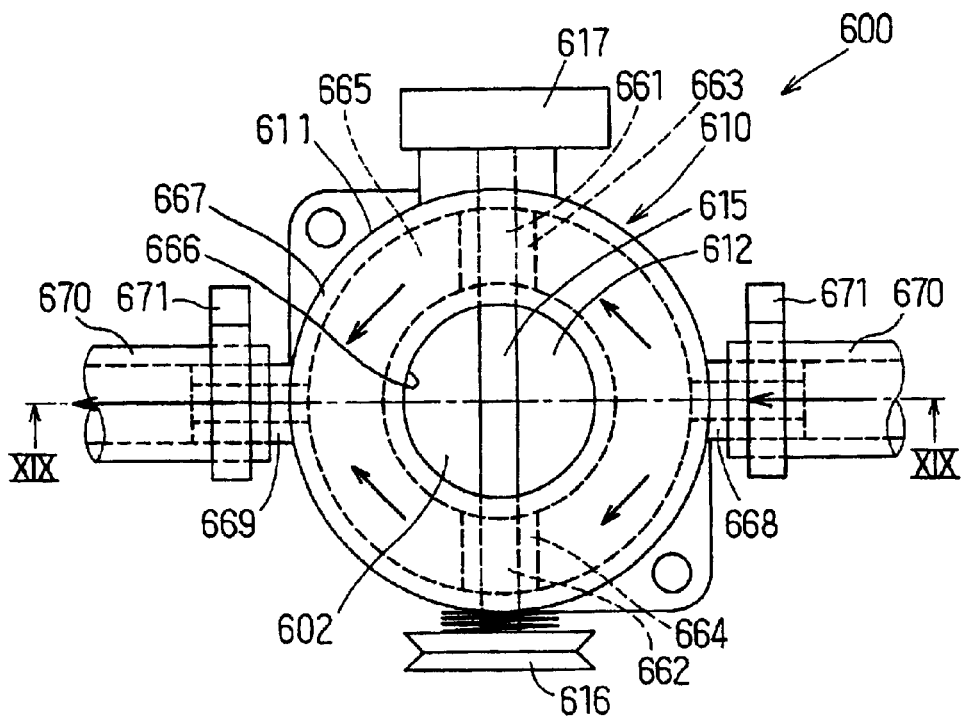
FIG. 18 is a plane view of an apparatus for controlling a throttle valve according to a tenth embodiment of the present invention.
Figure 19:
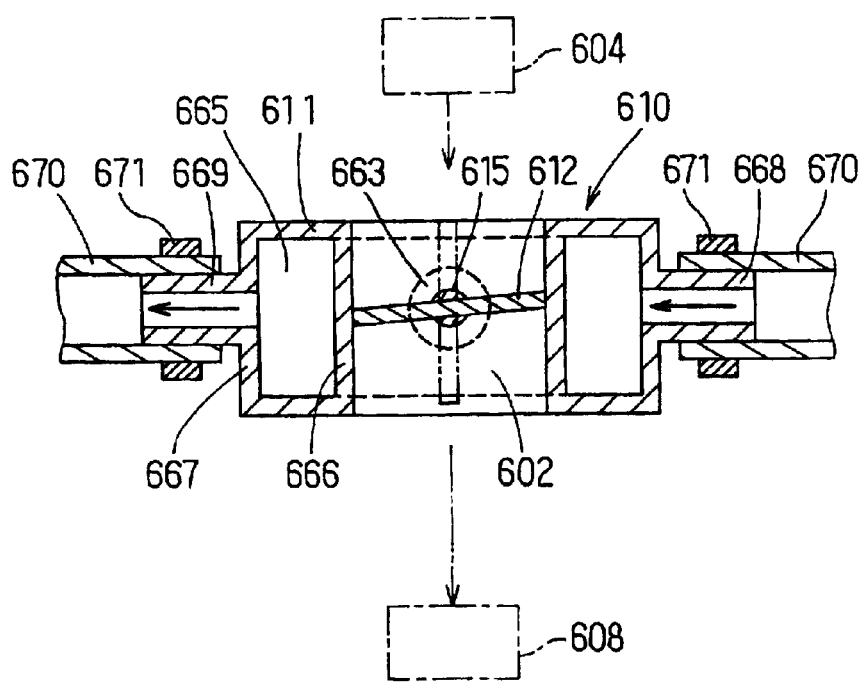
FIG. 19 is a sectional view on a sectional line XIX—XIX in FIG. 18.

A tenth embodiment of an apparatus for controlling a throttle valve will be explained. In this embodiment, the apparatus for controlling the throttle valve provides manual operations and controls of the throttle valve. FIGS. 18 and 19 shows an apparatus for controlling a throttle valve of a tenth embodiment.

An apparatus 600 has a valve housing 610 forming an intake passage 602, a valve shaft 615 supported in the valve housing 610 to be capable of freely rotating, a valve 612 fixed to the valve shaft 615 to vary the opening area of the intake passage 602, a transmitting member 616 for transmitting a turning force to the valve shaft 615 and a turning angle sensor 617 for detecting the turning angle of the valve shaft 615. As shown in FIG. 19, the apparatus 600 is arranged, when it is mounted on a vehicle, so that its intake upstream side communicates with an intake air duct having an air filter 604 in an airtight manner, and so that its intake downstream side communicates with an internal combustion engine 608 having an intake manifold in an airtight manner.

The valve housing 610 is made of a resin material and forms a substantially cylindrical intake pipe as shown in FIGS. 18 and 19. The valve housing 610 has the intake passage 602 in the air intake pipe.

As shown in FIG. 19, the valve housing 610 includes an outer peripheral wall part 611 forming the intake passage 602 therein, and bearing parts 663 and 664 for supporting both end portions 661 and 662 of the valve shaft 615 to be capable of freely rotating. The outer peripheral wall part 611 has a predetermined thickness so as to form a circular section of the air intake passage as shown in FIG. 19. The bearing parts 663 and 664 are formed in substantially cylindrical forms (see FIG. 19), and their inner parts directly bear both end portions 661 and 662 so that the valve shaft 615 is capable of freely rotating. The bearing parts 663 and 664 provide bridge portions to connect an inner wall and an outer wall of the wall 611.

The detail of the structures and functions of the valve housing 610, specially, the outer peripheral wall part 611 and the bearing parts 663 and 664 which are the main parts will be described below.

The valve shaft 615 is formed in a substantially cylindrical shape and is supported by both of the bearing parts 663 and 664 to be capable of freely rotating. One end portion 661 of the valve shaft 615 is accommodated in the bearing part 663. The other end portion 662 passes through the bearing part 664 and an external force for externally rotating the valve shaft 615 is exerted thereon. The lever 616 is engaged with an accelerator pedal (not shown) on vehicle through an accelerator wire (not shown).

The external force exerted on the valve shaft 615 is not limited to a mechanical external force interlocking with the movement of the accelerator pedal through the lever 616. An electrical external force by a driving motor for driving the valve shaft 615 so as to freely rotate may be employed.

The valve 612 is fixed to the valve shaft 615 so as to make the opening area of the intake passage 602 variable and disposed in the intake passage 602 to be capable of rotating together with the valve shaft 615.

As shown in FIG. 19, when the turning angle of the valve shaft 615 is located at a completely closed position, that is, when the valve 612 is located at its completely closing position, the valve 612 is held at a position shown by a solid line. The valve 612 makes the opening area of the air intake passage 10a none, that is, the valve body makes the intake passage 602 (specifically, a cross-section) close. Further, when the valve 612 is located at its completely opening position, the valve 612 is held at a position shown by a two-dot chain line so as to completely open the opening area of the intake passage 602, that is, held substantially perpendicularly to the cross-section of the intake passage 602.

Therefore, since the valve 612 is ordinarily freely or movably fitted to the intake passage 602 within a range in the vicinity of a position where the turning angle of the valve shaft 615 is located at its completed closed position. Especially at the completely closing position, the valve 612 is fitted to the intake passage 602 so as to close the intake passage 602. Therefore, so-called icing is susceptible to occurring, since the valve 612 or the valve shaft 615 is apt to be frozen with the valve hosing 610 due to vapor condensation caused by leaving the device in a low temperature environment. The structural features of the present invention for preventing the icing state will be described hereinafter.

The turning angle sensor 617 detects the turning angle of the valve shaft 615, and is a known sliding resistor for varying a resistance value in accordance with the turning angle of the valve shaft 615.

There will be described below the structural feature for heating the valve housing 610, particularly the outer peripheral wall part 611 forming the intake passage 602 and the bearing parts 663 and 664 for rotatably supporting the valve shaft 615 which are the main parts.

As shown in FIGS. 18 and 19, in the outer peripheral wall part 611, a hollow part 665 having an annular space formed between the inner peripheral wall 666, outer peripheral wall 667 and both axial end walls. The bearing parts 663 and 664 bridges both of the peripheral walls.

More specifically, the inner peripheral wall 666 defines the intake passage 602. The bearing parts 663 and 664 are fixed in an airtight manner between the peripheral walls so as to bridge over them. Therefore, the hollow part 665 is formed in a substantially annular form to surround the intake passage 602 at a radial outside of the valve 612.

The outer peripheral wall 667 has connecting pipes 668 and 669 for introducing and discharging a heat conductive medium, such as hot water. As shown in FIGS. 18 and 19, the connecting pipes 668 and 669 are respectively connected to pipe 670 made of rubber in an airtight manner. The pipes 670 provide with clamps 671 as dislocation preventing means.

The heat conductive medium may be fluid capable of circulating and being introduced to and discharged from the space R and may be either liquid or gas. In the embodiments of the present invention, the heat conductive medium will be described as the hot water, hereinafter.

The hot water enters the annular hollow part 665 from the connecting pipe 668 in the direction shown by an arrow mark in FIG. 18, flows along the inner peripheral wall 666. The hot water especially flows on the outer periphery of the wall 666 and the outer peripheries of the bearing portions 663 and 664, and then flows out from the connecting pipe 669.

Thus, the hot water passes through the annular hollow part 665, so that the hollow part 665 can form a heat conductive medium passage (refer it to as a hot water passage, hereinafter). Since the airtight hollow part 665 is formed in the valve housing 610 made of a resin material, the capacity of the hot water passage 665 is increased depending on the size. Therefore, since the apparatus can increase the capacity of the hot water passage, a heating capability for preventing frost is improved.

In addition, since the hot water introduced to the hollow part 665 can directly heat the wall 666 defining the intake passage 602 and the bearing portions 663 and 664, the wall 666, the valve 612 and the valve shaft 615 are assuredly prevented from being frozen.

As a method for producing the valve housing 610 made of the resin material, the hollow part 665 may be formed by employing a resin blow molding method, a resin molding method by using a lost-wax type core and the like. In case of using the resin blow molding method or the resin molding method by the lost-wax core, it is possible to provide a seamless type valve housing 610 can be integrally formed. In this case, at least one of the pipes 668 and 669 may be used as an opening to introduce a pressurized air in the resin blow molding method or to support the core in a molding cavity.

Thus, reliability of the air-tightness such as an anti-air leakage is improved in comparison with a conventional arrangement which uses airtight members such as seal gaskets.

Figure 20:
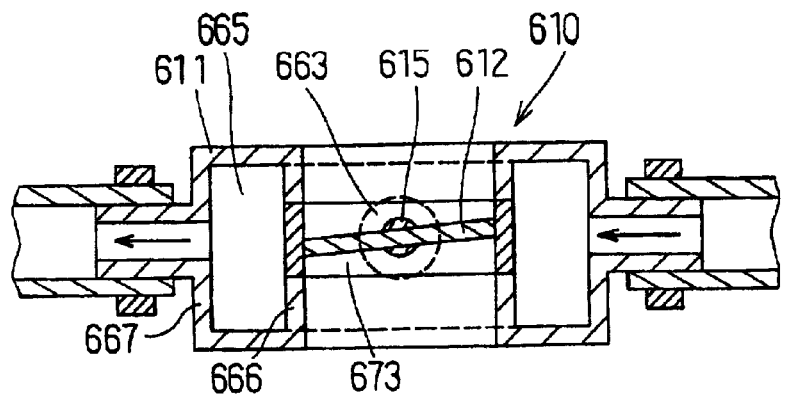
FIG. 20 is a sectional view of an apparatus for controlling a throttle valve according to an eleventh embodiment of the present invention.

FIG. 20 shows a eleventh embodiment of an apparatus for controlling a throttle valve. In this embodiment, an insert core 673 is added to the inner peripheral wall 666.

As shown in FIG. 20, the insert core 673 made of annular metal is provided in the vicinity of the completely closing position of the valve 612. Accordingly, the insert core 673 made of a metal material having a thermal conductivity higher than that of the resin material can be disposed so that a heating capability is improved.

Since the insert core 673 is arranged within a range in the vicinity of a position where the valve 612 is completely closed, that is, within a range in which the valve 612 is freely or movably fitted to an intake passage 602 or fitted to the intake passage, a frost prevention is assuredly implemented.

A method for providing the insert core 673 in a valve housing 610 is not limited to a method for casting the insert core 673 when the valve housing 610 is subjected to a resin molding method. A method may be employed for dividing the valve housing 610, performing the resin molding method for the valve housing, and then holding the insert core 673 between the divided valve housing parts as in an embodiment described below.

Figure 21:
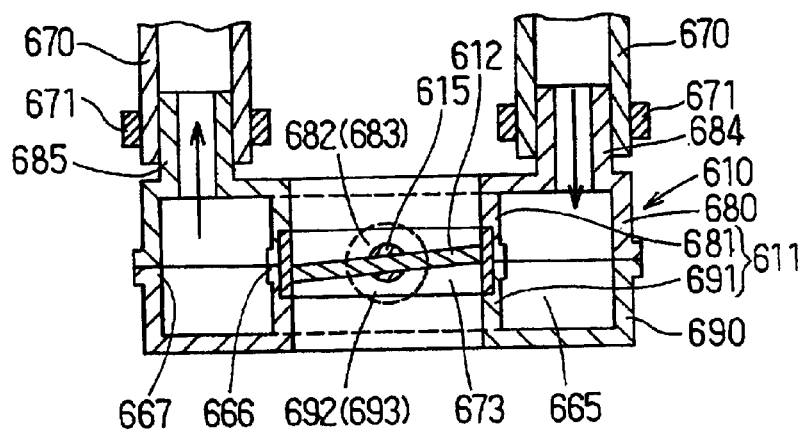
FIG. 21 is a sectional view of an apparatus for controlling a throttle valve according to a twelfth embodiment of the present invention.

FIG. 21 shows a twelfth embodiment of an apparatus for controlling a throttle valve. In this embodiment, the valve housing 610 is made of two parts. The hollow part 665 is formed by grooves formed on the parts respectively.

As shown in FIG. 21, the valve housing 610 is axially divided into a first housing 680 and a second housing 690 along an axis of the intake passage, and made of a resin material upon resin molding. The first housing 680 has a wall part 681 and bearing parts 682 and 683. The second housing 690 has a wall part 691 and bearing parts 692 and 693. The wall parts 681 and 691 form the wall portion 611 that defines the intake passage 602 and the annular hollow part 665 therein. The first housing 680 is joined to the second housing 690 by employing a vibration weld sticking method and the like.

As shown in FIG. 21, connecting parts 684 and 685 are provided on the first housing 680 for introducing hot water to or discharging it from the hollow part 665. The connecting parts 684 and 685 may be provided in either the first housing 680 or the second housing 690.

Accordingly, the capacity of the hot water circulating passage of the hollow part 15 is increased in accordance with the size of an interior space of the hollow part 665. A heating capability for frost prevention is improved. The hot water introduced to the hollow part 665 can directly heat the wall 666 defining the intake passage 602, and the bearing parts 682, 683, 692 and 693. The intake passage 602, the valve 612 and the valve shaft 615 are assuredly prevented from being frozen.

Further, the valve housing 610 is divided, and the divided valve housings are formed of a resin material. The valve housing 610 subjected to a resin molding method, that is, the die designs of the first housing 680 and the second housing 690 is designed more easily, compared with an integral resin molding work by using a blow molding method and the like. Therefore, a manufacture cost for the resin molding such as the cost of the dies is reduced. Consequently, the inexpensive apparatus for controlling the throttle valve can be provided.

As shown in FIG. 21, the insert core 673 may be sandwiched between the first housing 680 and the second housing 690. Thus, the insert core 673 made of metal having a thermal conductivity higher than that of the resin material can be provided as in the above embodiments. In addition, since the insert core 673 is arranged within a range in the vicinity of a position where the valve 612 is completely closed, that is, within a range in which the valve 612 is freely or movably fitted or fitted to the intake passage 602, frost prevention is assuredly attained.

Figure 22:
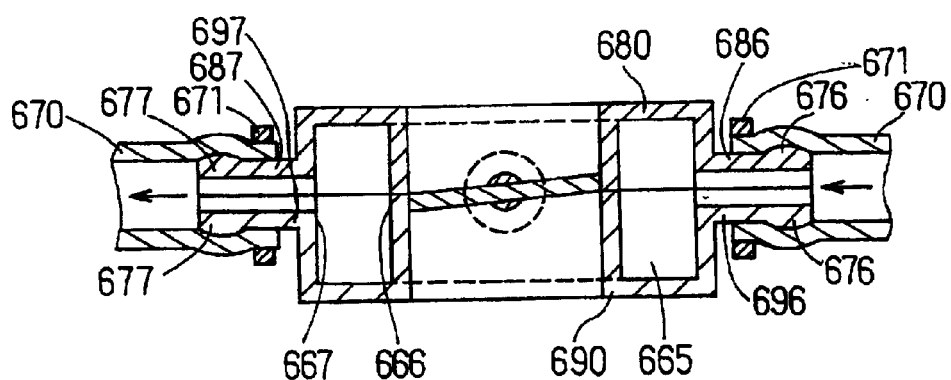
FIG. 22 is a sectional view of an apparatus for controlling a throttle valve according to a thirteenth embodiment of the present invention.

FIG. 22 shows a thirteenth embodiment of an apparatus for controlling a throttle valve. In this embodiment, one of the connecting pipes is formed by a part 686 integrally formed on the first housing 680 and a part 696 integrally formed on the second housing 690. In the same manner, another one of the connecting pipes is formed by a part 687 integrally formed on the first housing 680 and a part 697 integrally formed on the second housing 690.

Accordingly, the connecting pipes may provide with bulges 676 and 677 for preventing the dislocation of pipes 670 by taking the designs of dies into consideration.

The dislocation of the pipes 670 is assuredly prevented, so that the lowering of reliability in the air-tightness such as an air leakage is surely prevented.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus for controlling a throttle valve, comprising:
   a valve which regulates an air amount flowing in an intake pipe of an internal combustion engine in accordance with an opening degree; and
   a motor which operates the throttle valve to change the opening degree, wherein
   at least a part of a yoke of the motor is arranged to dissipate heat to the air, wherein the part of the yoke is directly exposed to the air in the intake pipe, and
   the part of the yoke is exposed at a vicinity of the valve for preventing the valve from an icing.

2. The apparatus for controlling the throttle valve according to claim 1, further comprising a heat conductive member which is in contact with the part of the yoke, wherein the part of the yoke dissipates heat through the heat conductive member.

3. The apparatus for controlling the throttle valve according to claim 2, wherein a part of the heat conductive member is exposed to the air in the intake pipe.

4. The apparatus for controlling the throttle valve according to claim 2, wherein a part of the heat conductive member is exposed to the outside air.

5. The apparatus for controlling the throttle valve according to claim 3, wherein the other part of the heat conductive member is exposed to the outside air.

6. The apparatus for controlling the throttle valve according to claim 1, further comprising a heat conductive member which is in contact with the other part of the yoke, wherein a part of the heat conductive member is exposed to the air in the intake pipe.

7. The apparatus for controlling the throttle valve according to claim 1, further comprising a heat conductive member which is in contact with the other part of the yoke, wherein a part of the heat conductive member is exposed to the outside air.

8. The apparatus for controlling the throttle valve according to claim 6, wherein the other part of the heat conductive member is exposed to the outside air.

9. The apparatus for controlling the throttle valve according to claim 2, wherein the heat conductive member has an uneven surface for improving a heat dissipation to the air.

10. The apparatus for controlling the throttle valve according to claim 1, further comprising a member which defines the intake pipe accommodating the valve and a passage in which a heat conductive medium flows, wherein the passage is arranged along an outside of the valve, and a part of the passage is arranged through a vicinity of the motor.

* * * * *